(12) United States Patent
Nasiri et al.

(10) Patent No.: US 10,404,098 B2
(45) Date of Patent: Sep. 3, 2019

(54) BATTERY MANAGEMENT SYSTEM

(71) Applicants: General Electric Company, Schenectady, NY (US); UWM Research Foundation, Inc., Milwaukee, WI (US)

(72) Inventors: Adel Nasiri, Mequon, WI (US); Seyed Ahmad Hamidi, Milwaukee, WI (US); Russell Wayne Hum, Waukesha, WI (US); John Ferdinand Bopp, West Bend, WI (US)

(73) Assignees: UWM RESEARCH FOUNDATION INC., Milwaukee, WI (US); GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/992,787

(22) Filed: May 30, 2018

(65) Prior Publication Data
US 2018/0278087 A1    Sep. 27, 2018

Related U.S. Application Data

(62) Division of application No. 15/076,403, filed on Mar. 21, 2016, now Pat. No. 10,003,214.

(51) Int. Cl.
*H02J 3/00*    (2006.01)
*H02J 7/00*    (2006.01)
*H02J 9/06*    (2006.01)

(52) U.S. Cl.
CPC ............ *H02J 9/061* (2013.01); *H02J 7/0014* (2013.01); *H02J 7/0021* (2013.01); *H02J 7/0065* (2013.01)

(58) Field of Classification Search
CPC ................................. H02J 9/061; H02J 7/0065
USPC ........................................ 307/80, 84, 82, 64
See application file for complete search history.

(56) References Cited

U.S. PATENT DOCUMENTS

| | | | |
|---|---|---|---|
| 2,683,575 A1 | 3/2010 | Berdichevsky et al. | |
| 7,796,736 B2 | 9/2010 | Kasuya | |
| 8,307,223 B2 | 11/2012 | Tae et al. | |
| 8,436,575 B2 | 5/2013 | Sim et al. | |
| 8,552,590 B2 * | 10/2013 | Moon | H02J 3/32 307/64 |
| 8,565,839 B2 | 10/2013 | Ma et al. | |
| 8,791,590 B2 * | 7/2014 | Rouis | B60R 16/0307 307/10.1 |
| 8,890,480 B2 * | 11/2014 | Vian | G01R 31/3651 320/132 |
| 2015/0036786 A1 | 2/2015 | Katcha et al. | |
| 2015/0123800 A1 * | 5/2015 | Montague | A61B 5/742 340/573.1 |

* cited by examiner

*Primary Examiner* — Dinh T Le

(57) ABSTRACT

A battery management system for monitoring battery cells of an uninterruptible power supply (UPS) coupled to a medical imaging load. The battery management system includes a first slave configured to obtain an operating parameter of a first battery cell. The first slave is configured to determine health of the first battery cell based at least in part on the operating parameter. The first slave is configured to generate a signal indicating the health of the first battery cell to communicate serially, via at least a second slave, to a master.

6 Claims, 4 Drawing Sheets

BATTERY MANAGEMENT SYSTEM

CROSS-REFERENCE TO RELATED APPLICATIONS

This application is a divisional of U.S. patent application Ser. No. 15/076,403, filed on Mar. 21, 2016, the disclosure of which is incorporated herein by reference in its entirety.

BACKGROUND

The subject matter disclosed herein relates to batteries, and more particularly, to a battery management system for medical imaging systems.

Uninterruptable Power Supply (UPS) systems are usually considered as a backup power for electrical systems, providing emergency power when the main power source fails. That is, UPS systems may ensure an uninterruptible, reliable and high quality electrical power for systems with loads where a continuous and reliable power supply is desired. Examples of such systems include healthcare systems, medical facilities and data centers. A UPS system may protect these systems against a power disturbance coming from a main source.

In the event of the power disturbance, UPS systems may use battery cells to provide power to one or more loads. For example, the battery cells may charge from power received from the main source. Then, the charged battery cells may discharge and provide power to the one or more loads during the power disturbance.

For many reasons, one of the battery cells may become unhealthy. For example, the battery cell may not be charged sufficiently to provide power to the one or more loads and/or a charge of the battery cells may become unbalanced as compared to other battery cells of the UPS. For the foregoing reasons, there is a need to improve monitoring systems for batteries.

BRIEF DESCRIPTION

In a first embodiment, a battery management system for monitoring battery cells of an uninterruptible power supply (UPS) coupled to a medical imaging load includes a first slave configured to obtain an operating parameter of a first battery cell, determine a health associated with safe operating conditions of the first battery cell based at least in part on the operating parameter, and generate a signal indicating the health of the first battery cell to communicate serially, via at least a second slave, to a master.

In a second embodiment, a battery management system for an uninterruptible power supply (UPS) configured to provide power to a medical imaging load includes a drawer including a plurality of battery cells, a plurality of slaves, wherein each slave of the plurality of slaves is configured to monitor a health associated with safe operating conditions of one or more of the plurality of battery cells, wherein at least one slave of the plurality of slaves is configured to provide a first signal indicating the health of the plurality of battery cells, and a master configured to receive the first signal and to generate a second signal based on the health of the plurality of battery cells.

In a third embodiment, a system includes an alternating current to direct current (AC-DC) converter configured to transform alternating current from an AC supply into direct current at a first voltage to supply power one or more medical imaging loads on a DC bus, a DC-DC converter configured to transform power from the first voltage to a second voltage to charge a plurality of battery cells, and a battery management system including the plurality of battery cells and a processor, wherein the processor is programmed to obtain an operating parameter of a first battery cell of the plurality of battery cells, determine a health associated with safe operating conditions of the first battery cell based on the operating parameter, and generate a signal indicating health of the first battery cell.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
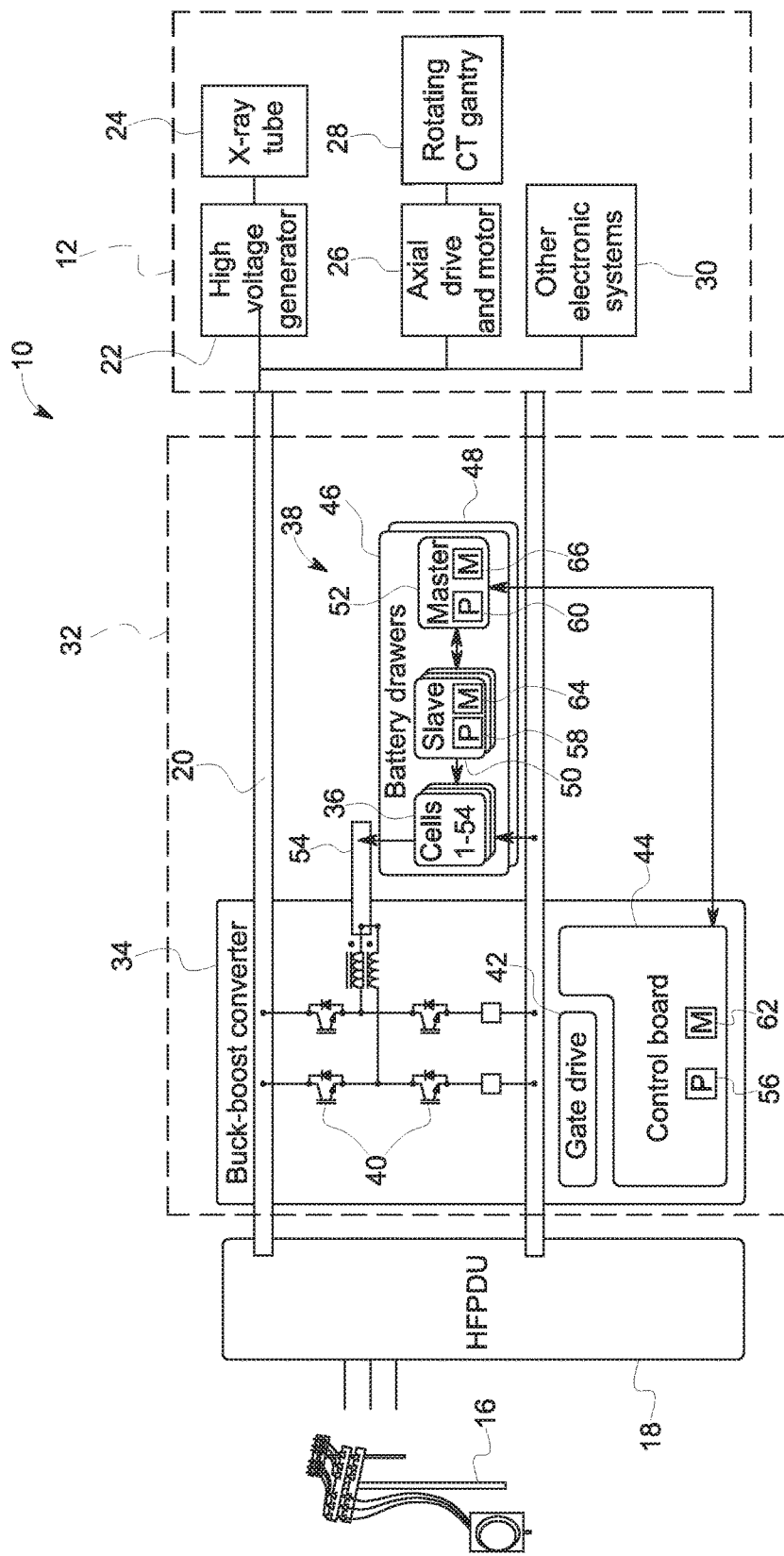
FIG. 1 is a block diagram of a system with an uninterruptable power supply (UPS) having a battery management system (BMS), in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Systems and methods of the present disclosure are related to a battery management system of an uninterruptible power supply (UPS) for medical imaging systems. A medical imaging system may use a UPS system to continue operation during electric power disturbances, such as outages or faults. For example, the UPS system may include a converter that couples one or more cells of a battery to a direct current (DC) bus that provides power to the medical imaging system.

For a variety of reasons, there is a chance that the battery may fail. For example, the one or more cells may not be charged properly to supply power. As another example, a temperature of the cells may be greater than a temperature at which the cells are designed to operate. Alternatively and/or additionally, the charge of the one or more cells may become unbalanced compared to other cells. Unbalanced cells may cause storage capacity of the cells to decrease. In the event of battery failure, there may be an increased likelihood that the UPS will not provide adequate power to the medical imaging system.

The system may include a battery management system that monitors health of the one or more battery cells. Monitoring the health of the battery cells may include determining whether a temperature, state of charge (SOC), and/or voltage fall within an expected range (i.e., safe operating conditions). Further, the safe operating conditions may be defined by the design from the manufacturer of the one or more battery cells. Conversely, an unhealthy cell may be where an operating parameter of the one or more battery cells exceeds the safe operating conditions.

The battery management system may include a slave that communicates with other slaves to convey health information of the one or more battery cells. For example, the slave may be circuitry having a processor and memory that communicates with a master to provide health information to the master. That is, the master may control communication with the slave or other slaves to determine health information of the one or more battery cells. In an embodiment, one of the other slaves may then communicate the health information to the master that by providing a signal indicating health of the one or more battery cells. For instance, the slaves may send messages to one another serially to report the health information to the master.

Turning to the figures, FIG. 1 shows a system 10 that provides power to one or more medical imaging loads 12. A main alternating current (AC) power source may provide power via an AC power line 16, such as a 10-200 kVA (20 kVA) transmission line, coupled to an AC to direct current (DC) converter 18. The AC-DC converter 18, such as a high frequency power distribution unit (HFPDU), may convert the AC power to DC and provide the DC power, via a DC bus 20, to the medical imaging loads 12.

While one or more medical imaging loads 12 are described below with respect to loads related to a computed tomography (CT) system, it will be appreciated that embodiments are applicable for use with other imaging configurations. For example, embodiments may apply to loads related to mammography, tomosynthesis, angeography, or the like. The one or more medical imaging loads 12 may include a high voltage generator 22 coupled to the DC bus 20. The high voltage generator 22 may provide power to an X-ray tube 24, such as a CT imaging system. The X-ray tube 24 may emit X-ray beams toward a subject or object, such as a patient. The beam, after being attenuated by the subject, impinges upon an array of radiation detector. The intensity of the attenuated beam radiation received at the detector array may be dependent upon the attenuation of the X-ray beam by the subject. Each detector element of the detector array produces a separate electrical signal indicative of the attenuated beam received by each detector element. The electrical signals are transmitted to a data processing system for analysis which produces an image. Further, the X-ray source and the detector array may be rotated, via an axial drive and motor 26, about a gantry 28 within an imaging plane and around the subject or object. When the gantry 28 is rotated, it converts the power from the DC bus to rotational kinetic energy via the motor 26. Additionally, other electronic systems 30 may receive power from the DC bus 20.

The DC bus 20 may be electrically coupled to a UPS system 32. The UPS system 32 may include a DC-DC bidirectional converter 34 that charges and discharges one or more battery cells 36 of a battery management system 38. Further, the DC-DC bidirectional converter 34 may establish and regulate the DC bus 20. That is, in some embodiments, the AC power line 16 may provide support and power to the DC bus 20, but the DC-DC bidirectional converter 34 may control operation of the DC bus 20 and maintain the DC bus 20 to be at a certain voltage (e.g., 700 Volts (V)). In the event of power disruption (e.g., outages or faults), the DC-DC bidirectional converter 32 may provide power from the one or more battery cells 36 to the DC bus 20.

The DC-DC bidirectional converter 34 may be a buck-boost converter having switches 40 that are controlled to boost a voltage of power received from the one or more battery cells 36 to a higher voltage of the DC bus 20 to discharge power from the one or more battery cells 36 onto the medical imaging load 12. Further, the DC-DC bidirectional converter 34 may buck a voltage of power received from the DC bus 20 to the one or more battery cells 36 to charge the battery cells 36 via power from the AC power source that is rectified by the AC-DC converter 18.

The battery management system 38 may include battery drawers 46 and 47. Each of the drawers 46 and 47 may include one or more battery cells 36, slaves 50, and a master 52. Circuitry of the control system 44, the slaves 50, and/or the master 52 may each include processors 56, 58, and 60 or multiple processors and memory 62, 64, and 66. The processors 56, 58, and 60 may be operatively coupled to the respective memory 62, 64, and 66 to execute instructions for carrying out the presently disclosed techniques. These instructions may be encoded in programs or code stored in a tangible non-transitory computer-readable medium, such as the memory 62, 64, and 66 and/or other storage. The processors 56, 58, and 60 may be a general purpose processor (e.g., processor of a desktop/laptop computer), system-on-chip (SoC) device, or application-specific integrated circuit, or some other processor configuration. The memory 62, 64, and 66, in the embodiment, includes a computer readable medium, such as, without limitation, a hard disk drive, a solid state drive, diskette, flash drive, a compact disc, a digital video disc, random access memory (RAM), and/or any suitable storage device that enables the processors 56, 58, and 60 to store, retrieve, and/or execute instructions and/or data. The memory 62, 64, and 66 may include one or more local and/or remote storage devices.

The processor 56 may control the bidirectional converter 32 to provide power from the one or more battery cells 36 to the DC bus 20. The DC-DC bidirectional converter 34 may include switches 40 that open and close based on signals from a gate drive unit 42 and/or a control system 44. For example, the control system 44 may send one or more switching signals to control the switches 40. In some embodiments, the control system 44 may send the signals to the gate drive unit 42 to drive current to a gate of the switches 40 to open or close the switches 40.

The processors 56, 58, and 60 may communicate health information of the battery cells 36. In an embodiment, the control system 44, the slaves 50, and/or the master 52 may each include a microcontroller or include processes shared on microcontrollers that send and/or receive health information of the battery cells 36. For example, with respect to drawer 46, the processor 58 of the slave 50 may detect health information of the battery cells 36 and provide the health information to the master 52. The processor 60 of the master 52 may then generate a signal indicating health of the drawer 46 based upon the health information of the battery cells 36 provided by each of the slaves 50 of the drawer 46. Then, the master 60 may provide the signal to the control system 44 indicating the health of the drawer 46. The processor 56 of the control system 44 may then control the switches 40 and/or inputs 54 between the battery cells 36 and the DC-DC converter 34 based on the health of each of the drawers 46 and 48. That is, the processor 56 may send signals to the switches 40 to cause the switches 40 to enable charging of the battery cells 36 from power provided by the AC source onto the DC bus 20 while the battery cells 36 of the drawer are healthy. Further, the processor 56 may send signals to the switches 40 to cause the switches to enable discharging of the battery cells 36 through the DC-DC converter 34 and the DC bus 20 onto the medical imaging load 12.

Figure 2:
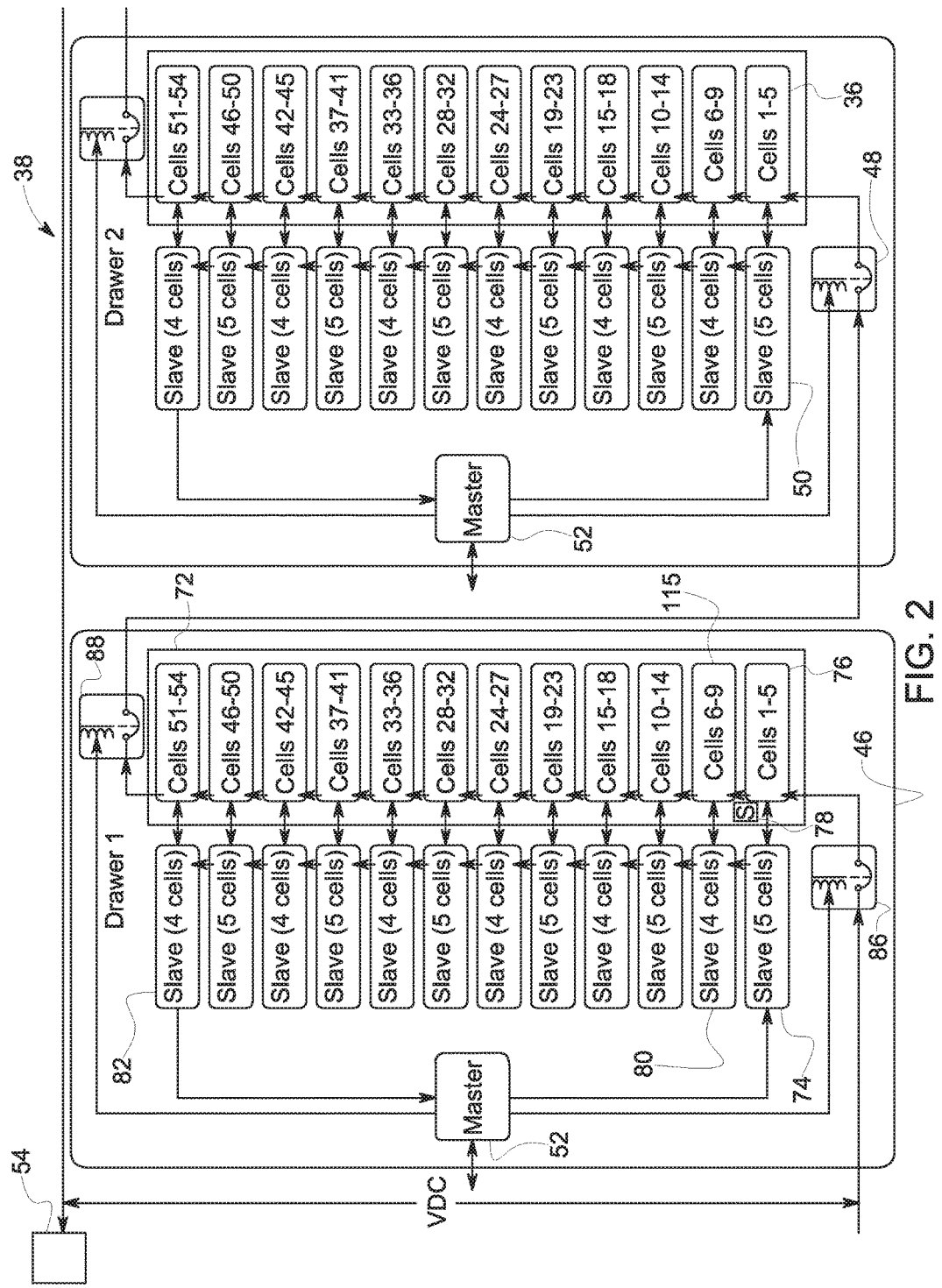
FIG. 2 is a block diagram of drawers of the BMS of FIG. 1, in accordance with an embodiment.

FIG. 2 is a block diagram of the battery management system 38 that monitors health of battery cells 36 in two drawers 46 and 48. While two drawers are depicted in FIG. 2, this is merely an example, and any suitable number of drawers (e.g., 1, 2, 3, 4 or more) may be used by the battery management system 38 for providing power to the one or more medical imaging loads 12. Further, the drawers 46 and 48 may be modular and removable by an operator in the event of an unhealthy cell or drawer. Due to the modularity of the drawers 46 and 48, the battery management system 38 may be configurable to include more or less battery drawers depending on the space available and the desires of the location of the medical imaging system. For example, if additional space is unavailable, the battery management system 38 may include fewer drawers. Conversely, if reliability and/or additional current is a factor, the battery management system 38 may include additional drawers.

As mentioned above, each drawer 46 and 48 may include multiple battery cells 36 of a battery pack 72, slaves 50, and a master 52. For example, the drawer 46 may include a slave 50 for each 4 or 5 battery cells 36. The battery cells 36 are electrically coupled to one another in series through bus bars on a board of the battery management system 38. Although the battery pack 72 of the drawer includes 54 cells, any suitable number of battery cells may be utilized. Further, the slaves 50 are illustrated as monitoring 4 or 5 battery cells are used here as an example, but any suitable configuration may be utilized. In some embodiments, the number of slaves per drawer may depend upon the voltage desired and the characteristics of the microcontroller. As used as an example, the processor 58 of a first slave 74 may monitor health of cells 1-5 76 electrically coupled to the first slave 74.

For example, the processor 58 may receive one or more signals from a sensor 78 or multiple sensors indicating operating parameters of the battery cells, such as temperature, state of charge (SOC), and/or voltages. The processor 58 may determine health of the battery cells 1-5 76 based on the temperature, SOC, and/or voltage measured via the sensor 78. For instance, the processor 58 of the first slave 74 may receive a signal indicating a voltage across terminals of at least one of the battery cells 36. The processor 58 of the first slave 74 may determine an SOC based on the measured voltage of the battery cells 36. That is, the measured voltage may correspond to a certain SOC of the battery cells 36. Further, the processor 58 may determine balance of the battery cells 36 by comparing the SOC of the battery cells 36 with other battery cells. In some embodiments, the processor 58 may determine whether the battery cells are charged, based on the voltage, prior to a charging phase of the UPS where the UPS charges the battery cells 36 and/or prior to a discharging phase of the UPS where the UPS provides power from the battery cells 36 to the one or more medical imaging loads 12.

The processor 58 of the first slave 74 may determine health information based on the measured operating parameter, such as the voltage and/or temperature. As an example, the processor 58 of the slave 50 may determine health of the battery cells 36 based on whether the battery cells 36 are charged above a threshold (e.g., based on the voltage) or are discharged below a threshold (e.g., based on the voltage). In other embodiments, the processor 58 may determine health of the battery cells 36 based on whether the temperature is within a predetermined threshold. For instance, the processor 58 may determine health based on whether the battery cells 36 are balanced with respect to one another. In an embodiment, the first slave 74 may control balance of the battery cells 36 via active dissipative balancing that balances the cells by removing energy from the cells with greater charge by dissipating the energy as heat. In another embodiment, the first slave 74 may control balance via passive balancing by dissipating extra energy from a cell on the associated balancing resistance of the cell. Then the processor 58 of the first slave 74 may generate a signal indicating health (e.g., healthy or unhealthy) of the battery cells 36 based on the determined health information.

After the processor 58 determines the health information, the health information may then be serially communicated to a second slave 80. For example, the first slave 74 may communicate a signal indicating that a specific cell is unhealthy. Further, the circuitry of the first and second slaves 74 and 80 may include an optical connection that enables communication through slave 80 as well as the other slaves for the other cells to slave 82. Moreover, the optical connection of the first and second slaves 74 and 80 may prevent overvoltage conditions in circuitry of the first and second slave 74 and 76. For instance, the first and second slaves 74 and 80 may include optocouplers that electrically isolate the first and second slaves 74 and 80 from one another.

The processors 58 of the slaves 74, 76, and 50 of each of the slaves of the drawer 46 may communicate health information serially through the other slaves 50 until the health information is communicated from an end slave 82 to the master 52. The processor 60 of the master 52 may receive the health information from the slave 82. As such, connections between the master 52 and the slaves may be minimized by having the slaves 74, 80, and 82 communicate serially between one another. While serial communication is used in FIG. 2, it is merely used as an example, and any suitable communication may be used between the master and the slaves. The processor 60 may then generate a signal to cause contactors 86 and 88 of the drawer 46 to open or close based on the health information. For example, if the slave 74 indicates that the battery cell 76 is unhealthy, then the master 52 may open the contactors 86 and 88 of the battery pack. Conversely, if the slave 74 indicates that each of the battery cells of the drawer 46 are healthy, then the master 52 may close the contactors to provide power to the DC-DC converter 34 through the inputs 54.

By having contactors 86 and 88 in each drawer 46 and 48 of the battery management system 38, the drawers 46 and 48 may be added or removed in a modular manner. As such, the drawers 46 and 48 may operate independent of one another. For example, the master 52 of the drawer 46 may provide a notification to the processor 56 to access power from the drawer 46 and send a signal to the contactors 86 and 88 to enable the DC-DC converter to draw power from the battery cells 36. Meanwhile, the master 52 of the drawer 48 may provide a notification of an unhealthy cell and open the contactors 86 and 88 of the drawer 48, thereby disabling current from flowing into or out of the drawer 48.

Figure 3:
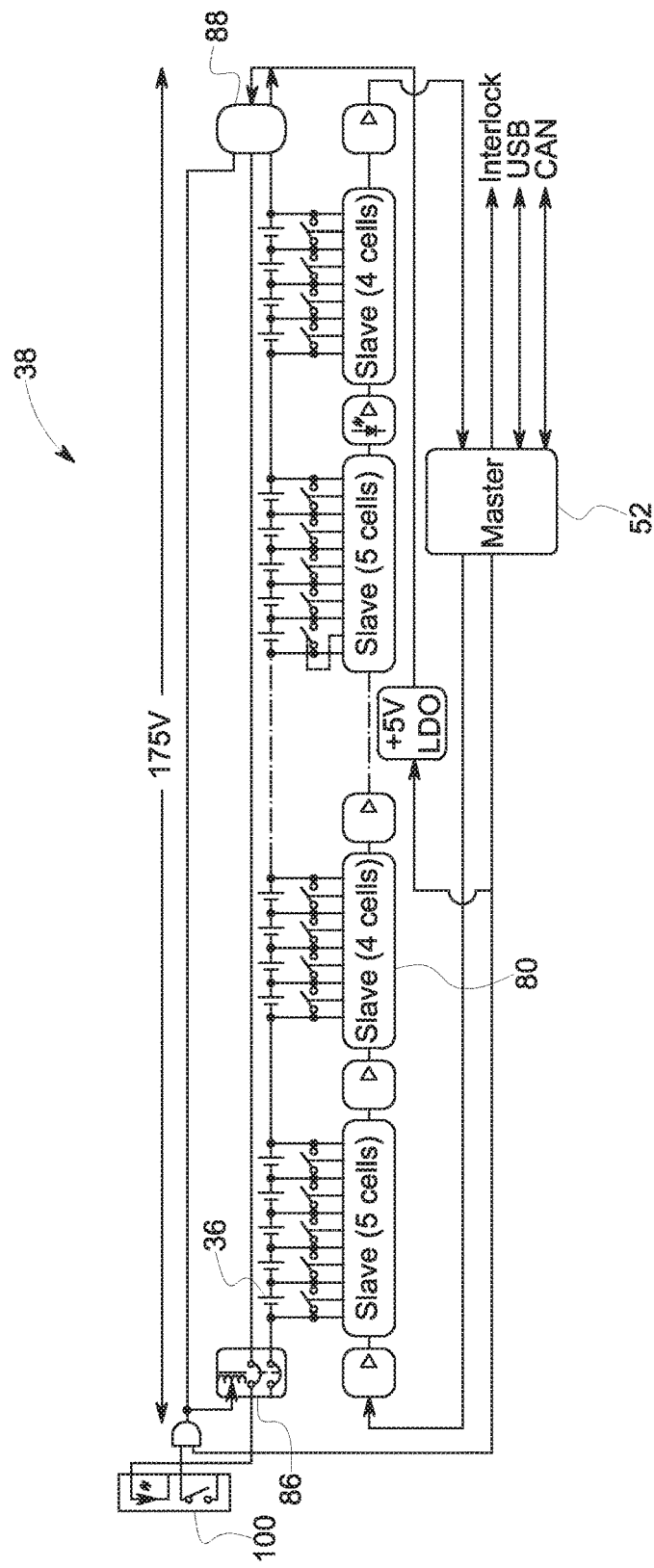
FIG. 3 is a schematic diagram of controls of the BMS of FIG. 1, in accordance with an embodiment.

FIG. 3 is a circuit diagram of the battery management system 38. As explained above, the first slave 74 may send health information serially through the second slave 80 to the end slave 82. The processor 60 of the master 52 may receive the health information from the end slave 82 or another slave 74 or 80 when using another configuration. The processor 60 may then generate a signal based on the health of the drawer 46. Further, processor 60 of the master 52 may communicate a signal to the processor 56 of the control system 44, via a controller area network (CAN), universal serial bus (USB), or the like, indicating whether the one or more medical imaging loads 12 may draw power from the drawer 46 of the master 52. Additionally and/or alternatively, the processor 60 may generate a signal identifying the battery cell 36 that is unhealthy to enable an operator to perform maintenance on the faulty cells. Moreover, based on the identification of the unhealthy cell, the operator may add or subtract cells or slaves without having to change physical interconnect to the master due to the serial communication. Further, due to the processor 60 sending a signal to open the contactors 86, and 88, the voltage differential the operator may come into contact with may be limited to the voltage of the battery cells.

Moreover, the drawer 46 may include a manual service interlock 100 in addition to the contactors 86 and 88. In an embodiment, the manual service interlock 100 may prevent an operator from accessing the battery cells 36 while the battery cells 36 are online. For example, if the battery cells are healthy (e.g., operational), an operator may manually close the interlock 100 to enable the battery cells 36 to provide power to the one or more medical imaging loads 12 discussed with respect to FIG. 1.

The processors 56, 58, and 60 may monitor the battery cells 36 periodically and/or during charging and/or discharging operations. For example, the processors 56, 58, and 60 may determine health of the battery cells 36 prior to charging. In some embodiments, the UPS may provide power from the battery cells 36 to the X-ray tube 24 during peak loads corresponding to a scan of the patient or object. For instance, the X-ray tube 24 may have a period of high power demand and a longer period of lower power demand than the period of high power demand. Prior to the period of high power demand, the processors 56, 58, and 60 may perform a process described with respect to FIG. 4 to monitor the batteries. Alternatively and additionally, the processors 56, 58, and 60 may perform the process described with respect to FIG. 4 prior to discharging power from the battery cells 36 onto the one or more medical imaging loads 12 during the period of peak loads corresponding to a scan of the patient or object.

Figure 4:
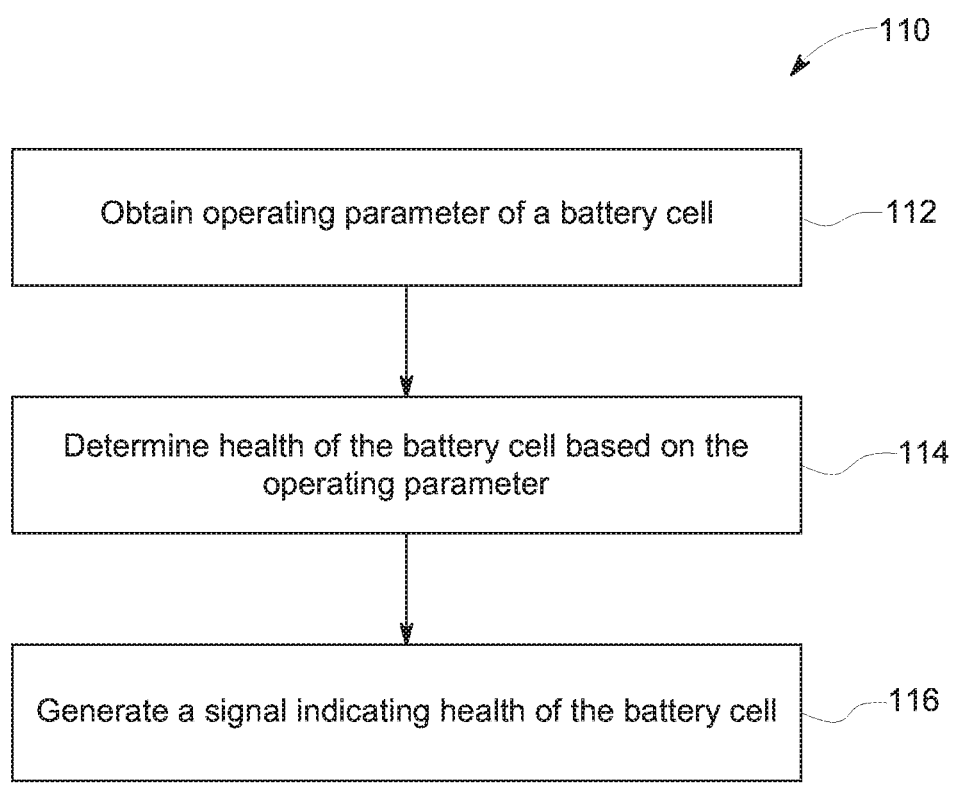
FIG. 4 is a flow chart of a process performed by a processor of the BMS of FIG. 2, in accordance with an embodiment.

FIG. 4 is a flow diagram of a process 110 performed by the processor 58 of one or more of the slaves 50, 74, 80, and 82. The process 110 may be stored in the memory 64 of the system 10 and executed as instructions by the processor 24 (e.g., running code). The processor 58 may begin by obtaining (block 112) an operating parameter of a battery cell 36. For example, the processor 58 may receive a signal from a sensor indicating a temperature of the battery cell 36. The processor 58 may then determine (block 114) health of the battery cell based on the operating parameter. For example, if the temperature is above a threshold, the processor 58 may determine that the battery cell 36 is unhealthy. The processor 58 may then generate (block 116) a signal based at least in part on the battery cell 36. For example, slave 80 may generate the signal based on the health of battery cells 6-9 115 as well as based on health of battery cells 1-5 as indicated by slave 74 because the health of the battery cells is communicated serially. For instance, if any of the battery cells are unhealthy, the slave may generate a signal indicating that the drawer is unhealthy. Further, the signal may indicate which cell of the battery cells is unhealthy.

Technical effects of embodiments of the disclosure include generating electrical signals based on health of battery cells. In an embodiment, one or more processors of a monitoring system may receive signals from sensors indicating temperature and/or voltage of a battery cell. The one or more processors may determine health of the battery cell based on the temperature and/or voltage. The one or more processors may generate a signal to control contactors that enable or disable flow of electricity to charge and discharge the battery cell. Further, the processor may generate a signal to cause another controller to open or close switches to cause the battery cell to charge and/or discharge. For example, the one or more processors may enable the battery cells to discharge power onto a medical imaging load.

This written description uses examples to disclose various embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
    an alternating current to direct current (AC-DC) converter configured to convert alternating current (AC) from an AC supply into direct current (DC) at a first voltage to supply power to one or more medical imaging loads on a DC bus;
    a DC-DC converter configured to transform the power at the first voltage to power at a second voltage to charge a plurality of battery cells; and
    a battery management system comprising the plurality of battery cells and a processor;
    wherein the processor is configured to:
        obtain an operating parameter of a first battery cell of the plurality of battery cells, wherein the operating parameter is a temperature, state of charge (SOC), a voltage, or any combination thereof;
        determine a health associated with safe operating conditions of the first battery cell based on the operating parameter;
        generate a signal indicating health of the first battery cell; and
        serially communicate the health of the first battery cell to a second processor coupled to a second plurality of battery cells, wherein the second processor and the second plurality of battery cells are different from the processor and the plurality of battery cells, respectively.

2. The system of claim 1, wherein the processor is configured to send a signal to a contactor coupled to the plurality of battery cells that causes the contactor to open or close based on the health of the at least one battery cell.

3. The system of claim 1, wherein the DC-DC converter is configured to transform the power at the second voltage to the first voltage to discharge power from the plurality of battery cells onto the one or more medical imaging loads.

4. The system of claim 1, wherein the processor is configured to indicate which of the plurality of battery cells is unhealthy.

5. The system of claim 1, wherein the DC-DC converter is configured to receive a health signal based at least in part on the health of the first battery cell and the DC-DC converter is configured to disable charge or discharge of the plurality of battery cells when the health signal indicates an unhealthy cell of the plurality of battery cells.

6. A system, comprising:
   an alternating current to direct current (AC-DC) converter configured to convert alternating current (AC) from an AC supply into direct current (DC) at a first voltage to supply power to one or more medical imaging loads on a DC bus;
   a DC-DC converter configured to transform the power at the first voltage to power at a second voltage to charge a plurality of battery cells; and
   a battery management system comprising the plurality of battery cells and a processor;
   wherein the processor is configured to:
      obtain an operating parameter of a first battery cell of the plurality of battery cells, wherein the operating parameter is a temperature, state of charge (SOC), a voltage, or any combination thereof;
      determine a health associated with safe operating conditions of the first battery cell based on the operating parameter;
      generate a signal indicating health of the first battery cell; and
      serially communicate, via optical communication, the health of the first battery cell to a second processor coupled to a second plurality of battery cells, wherein the second processor and the second plurality of battery cells are different from the processor and the plurality of battery cells, respectively.

* * * * *